Dec. 19, 1939.  T. W. BELL ET AL  2,183,904
WIRE LINE CLAMP
Filed Oct. 18, 1938  2 Sheets-Sheet 1
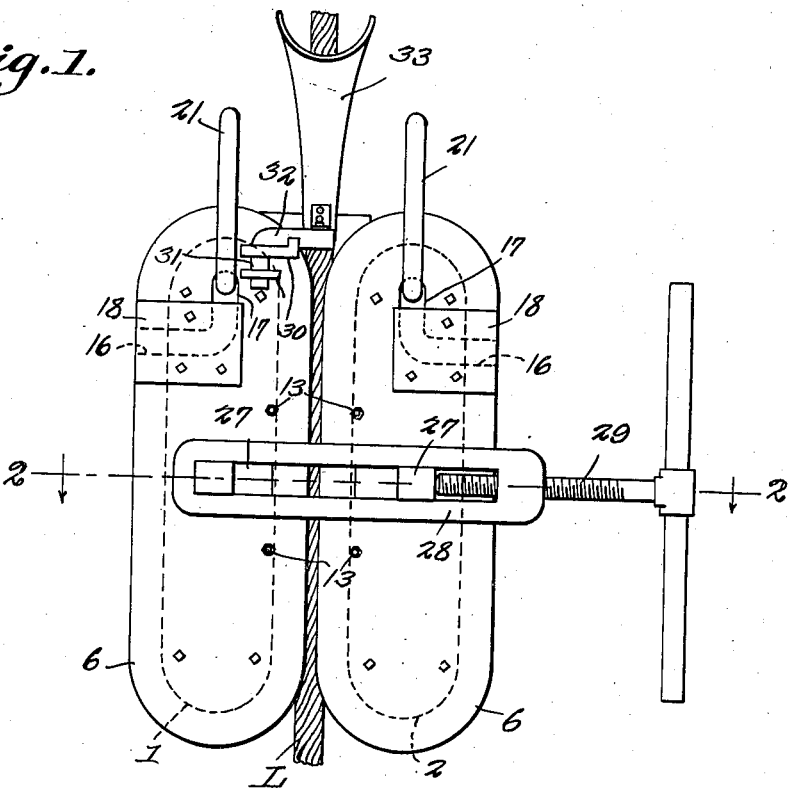
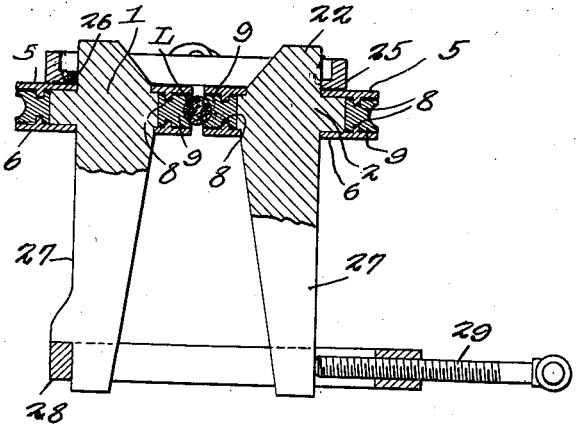
T. W. Bell
T. C. Rogers INVENTORS.
BY C. A. Snow & Co.
ATTORNEYS.

Dec. 19, 1939. T. W. BELL ET AL 2,183,904
WIRE LINE CLAMP
Filed Oct. 18, 1938 2 Sheets-Sheet 2
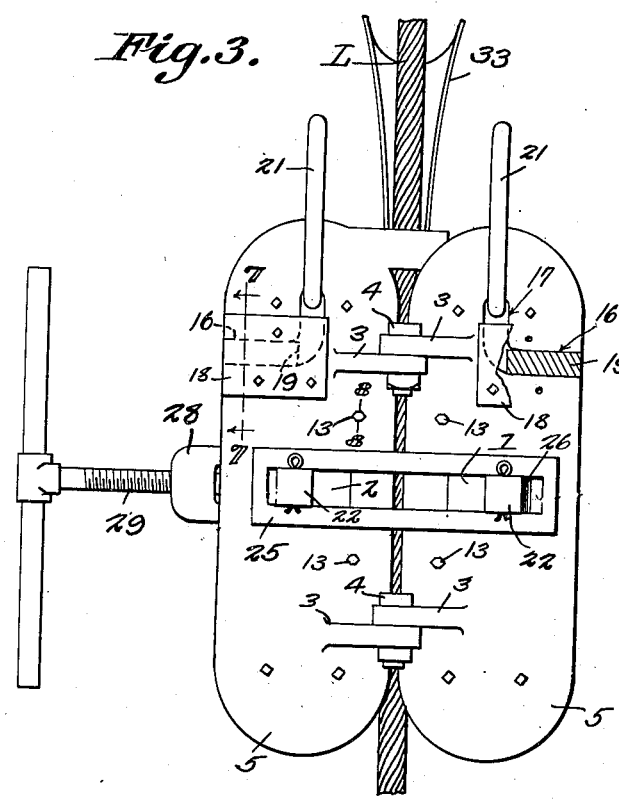
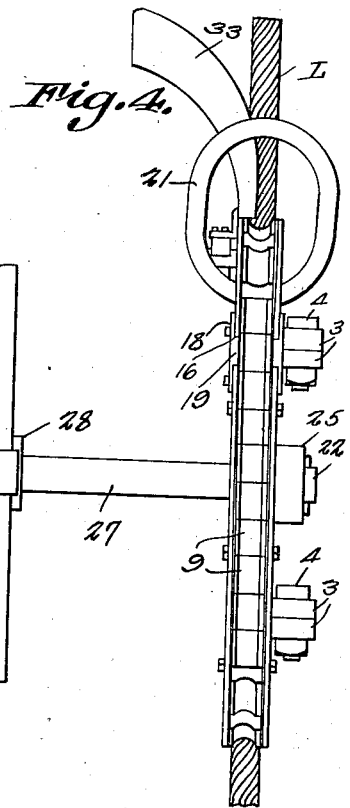
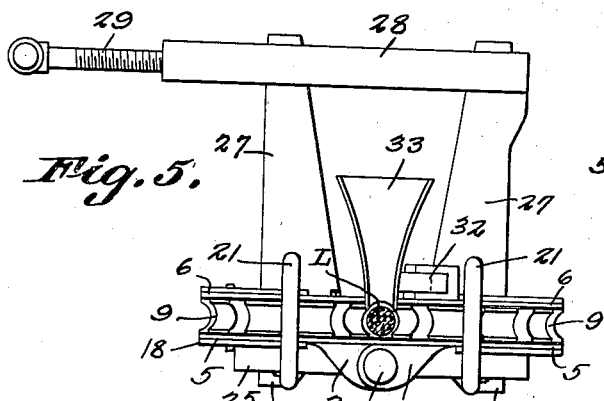
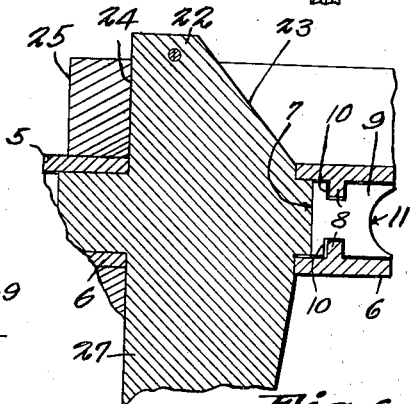
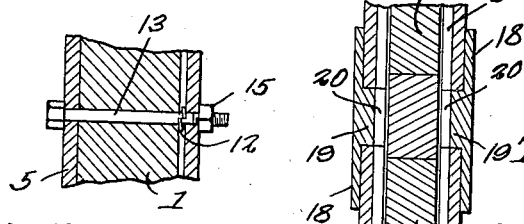
T. W. Bell
T. C. Rogers INVENTORS.
BY Ch Snowles
ATTORNEYS.

Patented Dec. 19, 1939

2,183,904

UNITED STATES PATENT OFFICE 2,183,904

WIRE LINE CLAMP

Thomas W. Bell and Thomas C. Rogers, Parkersburg, W. Va.

Application October 18, 1938, Serial No. 235,675

7 Claims. (Cl. 24—135)

This invention relates to a wire line clamp of the type shown, for example, in Patent 1,686,547, issued to us on October 9, 1928.

It is an object of the invention to provide a clamp of this character which will reduce excessive wear upon the line by providing endless series of movably mounted gripping blocks operatively supported in a new and novel manner.

A further object is to provide the clamp with a line guide so located as to prevent the line from fouling or stranding should it creep or slide through the clamp.

As is well known to those skilled in the art, when the tools are lowered into the well, previous to hitching on the clamp, the line hangs perpendicularly from the top of the shaft. However after the hitch is made a certain amount of slack is pulled off of the bull wheel and protrudes over the top of the clamp in order to permit free movement of the clamp upwardly and downwardly. In view of the fact that the grip line supports not only the weight of the drilling tools but also the length of cable below the clamp, it sometimes happens that the line will slip under the load, in which event the damage is done in the line where the sharp bend is made at the top of the clamp, this damage being due to the fact that some of the strands become caught between the gripping block. Wire line manufacturers are insistent that their lines be subjected to no bends or kinks of less diameter than that of the bull wheel shaft on which the cable is piled, this diameter being eighteen inches. For the purpose of meeting this requirement and avoiding damage resulting from the projection of sharp bends or kinks in the line above the clamp, is one of the objects of this invention.

A further object is to provide a line guide which is removably connected so as to eliminate danger of damage during shipment from one well operation to another.

A further object is to provide a clamp with gripping elements which includes simple but efficient means for controlling the movement of the gripping element, it being possible to hold the gripping element positively against movement when desired, as, for example, when subjected to heavy jarring during some kinds of fishing operations.

A further object is to eliminate many of the parts heretofore required in similar devices, thereby simplifying the construction.

A still further object is to provide means for the adjustment of the working parts necessary because of wear or variation in sizes of new or worn lines.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1 is a front elevation of the clamp.

Figure 2 is a section on line 2—2 Figure 1.

Figure 3 is an elevation showing the side of the clamp opposite to the one shown in Figure 1.

Figure 4 is a side elevation.

Figure 5 is a top plan view.

Figure 6 is a section showing a portion of the structure as illustrated in Figure 2 but adjusted, by means of shims, to a line of reduced diameter.

Figure 7 is an enlarged section on line 7—7 Figure 3.

Figure 8 is an enlarged section on line 8—8 Figure 3.

Referring to the figures by characters of reference, 1 and 2 designate the opposed jaws of the clamp each having a pair of lugs 3 extending from one side thereof, the lugs of one pair lapping the lugs of the other pair and being pivotally but loosely connected thereto by bolts 4. The upper and lower ends of the jaws are rounded and secured to the back face of each jaw is a guide plate 5 extending outwardly beyond all of the edges of the jaw. Another guide plate 6 is located in front of each of the jaws and also extends outwardly beyond all edges of the jaw, these guide plates and the jaw to which they are connected, cooperating to form an endless substantially elliptical channel or guide-way 7. Extending toward each other from the plates 5 and 6 are combined guiding and retaining ribs 8 forming a track along which gripping blocks 9 are adapted to travel. These blocks are formed with side grooves 10 into which the ribs 8 project loosely and the back or inner faces of the blocks are adapted to slide along the adjacent surface of the jaw. The outer face of each gripping block is recessed in the direction of its length, as indicated at 11, the recesses in these faces all cooperating to form a line receiving channel.

Truck gripping plates 6 normally spaced from its jaw by means of spring washers 12 mounted on bolts 13 which extend through the jaw and through both of its plates for the purpose of holding them assembled. Preferably four of these bolts are employed, these being located adjacent to those sides of the jaws which are nearest to each other and which sides are straight from end to end so that the blocks, when seated along these straight portions, will form opposed line gripping elements. Normally these elements, being retained by the ribs 8, can move freely along the guide channels formed by the plates and jaws and which channels extend along the inner or gripping sides of the jaws thence along the rounded ends of the jaws to the outer sides thereof. Should it be desired, however, to hold the gripping blocks against movement relative to the jaws, it is necessary merely to tighten the bolts 13 within the plates by means of nuts 15 whereby the front plates 6 will be forced against the action of the springs 12 so as to clamp the blocks firmly between the two plates. Normally, however, the blocks are free to move around the jaws to which they are connected.

Each of the jaws and the plates 5 and 6 fastened thereto, has a transverse slot 16 extending therethrough, this slot opening through the outer side of each jaw as clearly shown in Figures 1 and 3 having its inner end extended upwardly along the center line of the jaw as shown at 17. Cover plates 18 are detachably secured to the jaws for the purpose of concealing normally all portions of the slot except the upper ends of the upturned portions 17. These plates carry fillers 19 adapted to fit in the slots, as shown particularly in Figure 7, and the fillers, in turn, have ribs 20 which are adapted to aline with the adjacent portions of the ribs 8. Obviously the gripping block 9 can be readily inserted laterally through each slot 16 after one of the plates 18 has been removed so that in this manner the blocks can successively be placed in the channels 7 and along the track formed by the ribs 8. After the last block has been placed in position so that the entire channel surrounding the jaw is filled with blocks, plate 18 is replaced and the displacement of the blocks is thus prevented.

Before the plates 18 and the blocks 9 are placed in position, a supporting link 21 is inserted in the slot and brought into the upper end of the extension 17. Thus after plate 18 has been replaced, the link will be held securely to the jaw.

Formed on the back faces of the jaws 1 and 2 are extensions or lugs 22, these being located adjacent to the centers of said faces and one extension being located on each jaw. Those faces of the extensions which are nearest each other diverge outwardly as at 23 while the opposed faces 24 constitute shoulders or abutments which are disposed at right angles to the jaws. A traverse link 25 extends around these extensions and constitute a means for relieving the pivot bolts 4 from strain when a line is being clamped between the jaws. Because of the loose connection between the parts of the hinges, the points of contact between extensions 22 and link 25 become the fulcrums and, should the line to be gripped be worn or undersize from any cause, the distance between the ends of the link may be shortened by inserting shims 26 or other suitable spacing elements between extensions 22 and the link 25 as shown, for example, in Figure 6. Thus a better gripping action can be had between the blocks 9 of the device and line to be gripped, should the line be of reduced diameter.

Arms 27 are extended from each of the jaws at points directly opposite the extension 22 and these arms are adapted to be embraced by an elongated clevis 28 one end of which carries a screw 29 adapted to be adjusted so as to bear against one arm 27 so that by turning the screw in one direction, the two arms can be forced toward each other, thus causing those gripping blocks 9 which are between the jaws, to grip upon a line L interposed between said jaws.

Superposed gears 30 are extended forwardly from one of the jaws and are apertured so as to receive a stem 31 extending downwardly from a removable bracket 32. This bracket is secured to the lower end of a line guide 33 which is in the form of an upwardly and forwardly curved plate channeled in the direction of its length, the width of the channel increasing upwardly and the lower open end of said channel being located where it can receive that portion of the line directly above the engaged gripping blocks.

It will be obvious that when the gripping blocks between the jaws are in clamping engagement with the line L, any slippage of the line will result in the movement of the blocks therewith so that injury to the line is thus prevented. However should it be desired for any reason to hold the gripping blocks so that they cannot move with the line, it is merely necessary to tighten the bolts 12 so as to cause the plates 5 and 6 to grip the blocks between them.

The particular construction of clamp herein described has been found to be of considerable advantage in drilling operations. By providing the series of gripping blocks operating along endless tracks, the action of the wire line forces the blocks along these tracks so that a continuous gripping surface thus is provided. The design of the blocks is such that it is unnecessary to have any connecting pins or hinges between them. Nevertheless they will move with the line when drilling through the clamp. Thus danger of injuring the line is avoided.

It will be noted furthermore that by providing gripping blocks mounted as described, they operate to gradually reduce the line in size while they are gripping it. It is well known to those skilled in the art that a line becomes smaller or reduced in transverse area where it is gripped and also below the clamp where it is subjected to the enormous weight of the tools. Above the clamp the line is frequently noticeably greater in diameter because it is not subjected to a strain or load. Thus by having the endless series of gripping blocks, there is no danger of breaking the line or of otherwise injuring it during the change in transverse area resulting from the causes stated.

By using the wire line guide 33 injury to the line due to the looping and unlooping thereof is avoided as has already been stated. Furthermore this guide is readily removable so as to facilitate transportation of the clamp without danger of injuring the guide.

What is claimed is:

1. A wire line clamp including opposed jaws each having a continuous channel extending therearound, a movable connection between the jaws, plates secured to opposed faces of each jaw and extending beyond the channel, an endless series of blocks slidably mounted within each channel, means on the plates and cooperating with the blocks for holding said blocks assembled in the channel end to end, and means for adjusting the jaws angularly relative to each other to bind some of the blocks upon a line when interposed between the jaws.

2. A wire line clamp including opposed jaws each having a continuous channel extending therearound, a movable connection between the jaws, plates secured to opposed faces of each jaw and extending beyond the channel, an endless series of blocks slidably mounted within each channel, means on the plates and cooperating with the blocks for holding said blocks assembled in the channel end to end, and means for adjusting the jaws angularly relative to each other to bind some of the blocks upon a line when interposed between the jaws, and means for adjusting one of the plates on each of the jaws to bind the blocks between the plates.

3. A wire line clamp including opposed jaws hingedly connected, each jaw having a continuous channel extending therearound, plates mounted on opposed sides of each jaw, yielding means for holding one of the plates thrust away from the jaw, gripping blocks arranged in an endless series within each of the channels and between the plates, means on the plates and cooperating with the blocks for holding the blocks assembled end to end within the channel, means for swinging the jaws relative to each other to bind some of the blocks upon an interposed line, and means for adjusting one of the plates of each jaw relative to the opposed plates to bind upon the interposed blocks.

4. A wire line clamp including opposed jaws hingedly connected, each jaw having an endless channel extending therearound, plates connected to opposed faces of each jaw and extending beyond the channel, there being a slot extending transversely into each jaw and its plates and intersecting the channel, cover plates removably attached to the jaws and constituting closures for the slots, an endless series of abutting blocks slidably mounted within the channel in each jaw, cooperating means on each of the plates and the jaws for holding the jaws within the channels, one of said cover plates being removable for the insertion or withdrawal of a block into or from the channel, and means for adjusting the jaws angularly relative to each other.

5. A wire line clamp including opposed hingedly connected jaws, each of said jaws having an endless channel extending therearound, an endless line gripping structure in each of the channels including a series of abutting blocks mounted for sliding movement in the channel, cooperating means on the jaws and blocks for holding said blocks against displacement relative to the jaws and to each other, a slot opening through a side of each jaw and intersecting the channel, said blocks being separately removable or insertable through the slot, and a closure for the slot including means within said slot for holding the adjacent block against displacement within the channel.

6. A wire line clamp including opposed hingedly connected jaws, means for adjusting the jaws angularly relative to each other, each of the jaws having an endless marginal channel, there being slots extending into the jaws and intersecting the channels, each of said slots having an upturned inner end portion, an endless series of blocks mounted for movement within each channel, said blocks abutting at their ends, cooperating means on the jaws and blocks for holding said blocks against displacement relative to the channel, each block being separately insertable and removable through the slot in its jaw, and means covering the slot for retaining the blocks in the channel.

7. A wire line clamp including hingedly connected opposed jaws having marginal endless channels, there being a slot intersecting each channel, an endless series of abutting blocks within each channel, cooperating means on the blocks and jaws for holding the blocks against accidental displacement relative to the jaws, links for supporting the jaws, each of said links being insertable into the slot in one of the jaws, and means detachably secured to the jaws for holding the links against displacement from the slot and for holding the blocks against removal from the channels.

THOMAS W. BELL.
THOMAS C. ROGERS.